United States Patent [19]

Schimmel et al.

[11] Patent Number: 4,927,868

[45] Date of Patent: May 22, 1990

[54] HIGH SOLIDS COATING COMPOSITIONS CONTAINING A POLYEPOXIDE AND A COPOLYMER OF AN ALPHA-OLEFIN AND AN OLEFINICALLY UNSATURATED MONOANHYDRIDE

[75] Inventors: Karl F. Schimmel, Verona; William P. Blackburn, Evans City, both of Pa.

[73] Assignee: PPG Industries, Inc., Pittsburgh, Pa.

[21] Appl. No.: 87,012

[22] Filed: Aug. 19, 1987

[51] Int. Cl.$^5$ .................... C08L 63/02; C08L 33/08; C08K 5/07

[52] U.S. Cl. .................... 523/439; 525/117; 525/207

[58] Field of Search .................. 525/117, 207; 523/439

[56] References Cited

U.S. PATENT DOCUMENTS

| | | | |
|---|---|---|---|
| 3,412,111 | 11/1968 | Irwin et al. | 260/346.8 |
| 3,637,904 | 1/1972 | Barie, Jr. et al. | 525/117 |
| 3,900,440 | 8/1975 | Ohara et al. | 260/29.7 W |
| 4,097,449 | 6/1978 | Heilman et al. | 525/117 |
| 4,167,539 | 9/1979 | Heilman et al. | 525/117 |
| 4,211,851 | 7/1980 | Sasayama | 525/207 |
| 4,240,916 | 12/1980 | Rossi | 252/56 D |
| 4,358,573 | 11/1982 | Verbrugge | 526/272 |
| 4,507,411 | 3/1985 | Gordon et al. | 525/117 |
| 4,581,464 | 4/1986 | Ross et al. | 549/255 |
| 4,650,718 | 3/1987 | Simpson et al. | 528/112 |

FOREIGN PATENT DOCUMENTS 0693098  8/1964  Canada .................. 525/113

OTHER PUBLICATIONS

Gulf Specialty Chemicals technical paper entitled "GULF PA-18", date unavailable.

*Primary Examiner*—John C. Bleutge
*Assistant Examiner*—Robert E. L. Sellers, II
*Attorney, Agent, or Firm*—William J. Uhl; Daniel J. Long

[57] ABSTRACT

Curable, high solids, liquid coating compositions are disclosed. The resinous binder comprises a copolymer of an alpha-olefin or cycloolefin and an olefinically unsaturated monoanhydride which may include a half-ester thereof. The coating compositions are useful as clear coats in color-plus-clear automotive coatings and have good humidity resistance and mar resistance.

13 Claims, No Drawings

HIGH SOLIDS COATING COMPOSITIONS CONTAINING A POLYEPOXIDE AND A COPOLYMER OF AN ALPHA-OLEFIN AND AN OLEFINICALLY UNSATURATED MONOANHYDRIDE

BACKGROUND OF THE INVENTION

1. Field of the Invention:

The present invention is in the field of curable compositions and more particularly to curable coating compositions which are useful as clear coats in color-plus-clear coating applications. The invention also relates to a process for preparing color-plus-clear coated articles and to the coated articles themselves.

2. Brief Description of the Prior Art:

Color-plus-clear coatings involve the application of a colored or pigmented base coat to a substrate followed by the application of a transparent or clear top coat to the base coat. The composite coatings are becoming increasingly popular as original finishes for automobiles. The color-plus-clear coatings have outstanding gloss and distinctness of image, and the clear coat is particularly important for these properties. Two-pack clear coat compositions comprising polyols such as polyester polyols, polyurethane polyols and acrylic polyols and polyisocyanate curing agents give outstanding gloss and distinctness of image along with good humidity resistance and mar resistance. However, the polyisocyanates are difficult to handle being sensitive to moisture and require cumbersome safety precautions because of their toxicity.

U.S. Pat. No. 4,650,718 discloses crosslinkable coating compositions which avoid the problems of polyisocyanate curing agents. The crosslinkable coating compositions are based on polyepoxides and polyacid curing agents. Although these compositions can be formulated to produce cured coatings with excellent adhesion, gloss and distinctness of image (i.e., ability to reflect images in a clear, well-defined manner), the resultant cured coatings do not have optimum humidity and mar resistance.

SUMMARY OF THE INVENTION

The present invention provides for a curable, liquid coating composition containing an organic solvent and a resinous binder which comprises:

(a) a polyepoxide, and
(b) a copolymer of an alpha-olefin or cycloolefin and an olefinically unsaturated monoanhydride which may include a partial ester thereof.

The coating composition has a resin solids content of at least 40 percent by weight.

The invention also provides a process for applying a color-clear composite coating to a substrate in which the crosslinkable composition described above is in the clear coat. The invention further provides for the resultantly coated article.

DETAILED DESCRIPTION

The essential ingredients of the crosslinkable compositions of the present invention are the polyepoxide, the copolymer of an alpha-olefin or cycloolefin and an olefinically unsaturated monoanhydride which may include a partial ester thereof and preferably a polyacid.

Among the polyepoxides which can be used are epoxy-containing acrylic polymers which are preferred, epoxy condensation polymers such as polyglycidyl ethers of alcohols and phenols and certain polyepoxide monomers and oligomers.

The epoxy-containing acrylic polymer is a copolymer of an ethylenically unsaturated monomer having at least one epoxy group and at least one polymerizable ethylenically unsaturated monomer which is free of epoxy groups.

Examples of ethylenically unsaturated monomers containing epoxy groups are those containing 1,2-epoxy groups and include glycidyl acrylate, glycidyl methacrylate and allyl glycidyl ether.

Examples of ethylenically unsaturated monomers which do not contain epoxy groups are alkyl esters of acrylic and methacrylic acid containing from 1 to 20 atoms in the alkyl group. Specific examples of these acrylates and methacrylates are methyl methacrylate, ethyl methacrylate, butyl methacrylate, ethyl acrylate, butyl acrylate and 2-ethylhexyl acrylate.

Examples of other copolymerizable ethylenically unsaturated monomers are vinyl aromatic compounds such as styrene and vinyl toluene; nitriles such as acrylonitrile and methacrylonitrile; vinyl and vinylidene halides such as vinyl chloride and vinylidene fluoride and vinyl esters such as vinyl acetate. Acid group-containing copolymerizable ethylenically unsaturated monomers such as acrylic and methacrylic acid are preferably not used because of the possible reactivity of the epoxy and acid group.

The epoxy group-containing ethylenically unsaturated monomer is preferably used in amounts of from about 5 to 60, more preferably from 20 to 50 percent by weight of the total monomers used in preparing the epoxy-containing acrylic polymer. Of the remaining polymerizable ethylenically unsaturated monomers, preferably from 40 to 95 percent, more preferably from 50 to 80 percent by weight of the total monomers are the alkyl esters of acrylic and methacrylic acid.

In preparing the epoxy-containing acrylic polymer, the epoxide functional monomers and the other ethylenically unsaturated monomers can be mixed and reacted by conventional free radical initiated organic solution polymerization.

The epoxy-containing acrylic polymer typically has a number average molecular weight between about 1000 and 20,000, preferably 1000 to 10,000, more preferably 1000 to 5000. The molecular weight is determined by gel permeation chromatography using a polystyrene standard. In determining molecular weights in this fashion, it is not the actual molecular weights which are measured but an indication of the molecular weight as compared to polystyrene. The values which are obtained are commonly referred to as polystyrene numbers. However, for the purposes of this invention, they are referred to as molecular weights.

The epoxy condensation polymers which are used are polyepoxides, that is, those having a 1,2-epoxy equivalency greater than 1, preferably greater than 1 and up to about 3.0. Examples of such epoxides are polyglycidyl ethers of polyhydric phenols and of aliphatic alcohols. These polyepoxides can be produced by etherification of the polyhydric phenol or aliphatic alcohol with an epihalohydrin such as epichlorohydrin in the presence of alkali.

Examples of suitable polyphenols are 2,2-bis(4-hydroxyphenyl)propane (bisphenol A), 1,1-bis(4-hydroxyphenyl)ethane and 2-methyl-1,1-bis(4-hydroxyphenyl)propane. Examples of suitable aliphatic alcohols are ethylene glycol, diethylene glycol, 1,2-propylene glycol and 1,4-butylene glycol. Also, cycloaliphatic polyols such as 1,2-cyclohexanediol, 1,4-cyclohexanediol, 1,2-bis(hydroxymethyl)cyclohexane and hydrogenated bisphenol A can also be used.

Besides the epoxy-containing polymers described above, certain polyepoxide monomers and oligomers can also be used. Examples of these materials are those containing the cyclohexane oxide moiety. These polyepoxides are of relatively low molecular weight and of relatively high reactivity thus enabling the formation of high solids coating compositions with excellent cure response. The polyepoxides should have an average 1,2-epoxy equivalency of greater than one. The preferred polyepoxides are diepoxides, that is, having a 1,2-epoxy equivalency of two.

Various polyepoxides containing the cyclohexane oxide moiety are known. Particularly preferred in this regard is 3,4-epoxycyclohexylmethyl 3,4-epoxycyclohexane carboxylate. Also, the diepoxide bis(3,4-epoxy-6-methylcyclohexylmethyl) adipate can be used. These epoxides are commercially available from Union Carbide Corporation as ERL 4221 and ERL 4299, respectively. Also, epoxies containing the cyclohexane moiety are described in U.S. Pat. Nos. 2,890,194; 2,890,195; 2,890,196; 2,890,197; 2,890,210; 3,023,174 and 3,027,357.

Mixtures of polyepoxides, particularly mixtures of epoxy-containing acrylic polymers and polyepoxides containing a cyclohexane moiety, are preferred because they result in coating compositions which have high solids content and a good combination of coating properties, i.e., gloss, distinctness of image, adhesion, hardness and solvent resistance.

The polyepoxide is typically present in the liquid crosslinkable composition in amounts of about 20 to 75, preferably from 30 to 60 percent by weight based on total weight of resin solids.

The compositions of the present invention also contain a copolymer of an alpha-olefin or cycloolefin and an olefinically unsaturated monoanhydride which may include a partial ester thereof. The copolymer is typically present in the coating composition in amounts of 1 to 40, preferably 5 to 30 percent by weight based on weight of resin solids. The copolymer provides for good mar resistance and humidity resistance in the resultant cured coating. Amounts greater than 40 percent by weight ar less preferred because they adversely affect the hardness and Distinctness of Image (DOI) of the cured coating.

Among the alpha-olefins which may be used in the reaction with the olefinically unsaturated anhydride are those having from 4 to 14, preferably 4 to less than 10 carbon atoms. Alpha-olefins of less than 4 carbon atoms are undesirable because they are gaseous and difficult to handle; whereas alpha-olefins of 10 or more carbon atoms are less preferred because of poor hardness and DOI. Examples of alpha-olefins are 1-butene, 1-hexene, 1-octene, 2-methyl-1-heptene, 2,4,4-trimethyl-1-pentene, 1-nonene, 1-decene, 1-decene, 1-dodecene, 1-tridecene, 1-tetradecene and vinyl cyclohexane, with 1-octene being preferred. Examples of cyclo-olefins include cyclohexene and cyclooctene. Mixtures of alpha-olefins and cycloolefins can be used.

The olefinically unsaturated anhydride is of the structure:

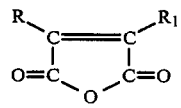

where R and $R_1$ are the same or different and are selected from the class consisting of hydrogen, lower alkyl containing from 1 to 4 carbon atoms, lower alkoxy containing from 1 to 4 carbon atoms and halo. Examples of suitable anhydrides include maleic anhydride which is preferred, itaconic anhydride, citraconic anhydride, chloromaleic anhydride, ethylmaleic anhydride and methoxymaleic anhydride.

Theoretically, one mole of the olefinically unsaturated anhydride is added to one mole of the alpha-olefin to obtain the desired reaction product. However, in order to obtain an effective addition reaction, a molar excess of olefin is usually employed. The reaction is carried out by heating the reactants together preferably in the presence of organic solvent and in the presence of a free radical initiator such as benzoyl peroxide, tert-amyl peroxyacetate or azo-type initiators at a temperature up to the reflux temperature of the alpha-olefin, generally from about 30° to 220° C., preferably from 80° to 180° C., for a time sufficient to complete the polmerization; typically from 0.5 to 10, preferably 1 to 5 hours.

To prepare preferred products, the time, temperature and catalyst are adjusted to prepare a product which has a weight average molecular weight of less than 15,000, more preferably 3000 to 12,000, as determined by gel permeation chromatography using a polystyrene standard. Molecular weights higher than 15,000 are not preferred because it is difficult to formulate coatings with high solids content.

Besides the anhydride copolymers, the partial ester derivatives formed by partially esterifying the copolymer with an alcohol can also be used and have been found to provide clear coats with less tendency to yellow. Among the alcohols which may be used include alkyl alcohols such as methanol and ethanol, arylalkyl alcohols such as benzyl alcohol, ether alcohols such as 2-butoxyethanol, ant tert-amino alcohols such as dimethylethanolamine. Usually, for each equivalent of anhydride functionality, up to one-half equivalent of alcohol is used. Esterification takes place by heating the anhydride copolymer and the alcohol together at reflux temperature for about 0.5 to 5 hours.

Preferably, the coating composition contains a polyacid containing two or more acid groups per molecule which are reactive with the polyepoxide. The polyacid provides for better DOI and hardness in the cured coatings. The acid functionality is preferably carboxylic acid, although acids such as sulfonic acid may be used but their use is not preferred. Preferably, the polyacid curing agent is a carboxyl-terminated material having at least two carboxyl groups per molecule. Among the polyacid curing agents which may be used include carboxylic acid group-containing polymers such as acrylic polymers, polyesters, and polyurethanes; oligomers such as ester group-containing oligomers and monomers.

The preferred polyacid curing agents are ester group-containing oligomers. Examples include half-esters formed from reacting polyols and 1,2-acid anhydrides. The half-esters are preferred because they are of relatively low molecular weight and are quite reactive with epoxy functionality enabling the formulation of high solids compositions while maintaining outstanding properties such as hardness and distinctness of image. The preferred polyacid curing agents are of the structure:

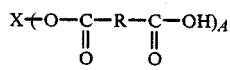

where X is the residue of the polyol after reaction with the 1,2-dicarboxylic acid anhydride, R is an organic moiety associated with the anhydride and A is equal to at least 2.

Among the anhydrides which can be used in the formation of the desired polyesters are those which exclusive of the carbon atoms and the anhydride moiety contain from about 2 to 30 carbon atoms. Examples include aliphatic, including cycloaliphatic, olefinic and cycloolefinic anhydrides and aromatic anhydrides. Substituted aliphatic aromatic anhydrides are also included within the definition of aliphatic and aromatic provided the substituents do not adversely affect the reactivity of the anhydride or the properties of the resultant polyester. Examples of substituents would be chloro, alkyl and alkoxy. Examples of anhydrides include succinic anhydride, methylsuccinic anhydride, dodecenyl succinic anhydride, octadecenylsuccinic anhydride, phthalic anhydride, tetrahydrophthalic anhydride, methyltetrahydrophthalic anhydride, hexahydrophthalic anhydride, alkyl hexahydrophthalic anhydrides such as methylhexahydrophthalic anhydride, tetrachlorophthalic anhydride, endomethylene tetrahydrophthalic anhydride, chlorendic anhydride, citraconic anhydride and maleic anhydride.

Among the polyols which can be used are those which contain from about 2 to 20 carbon atoms. Preferred are diols, triols and mixtures thereof. Examples include polyols containing from 2 to 10 carbon atoms. Examples include aliphatic polyols such as ethylene glycol, 1,2-propanediol, 1,3-propanediol, 1,4-butanediol, 1,5-pentanediol, glycerol, 1,2,3-butanetriol, 1,6-hexanediol, neopentyl glycol, diethylene glycol, dipropylene glycol, 1,4-cyclohexanedimethanol, trimethylolpropane, 2,2,4-trimethylpentane-1,3-diol, pentaerythritol and 1,2,3,4,-butanetetrol. Aromatic polyols such as biphenol A and bis(hydroxymethyl) xylene can also be used.

When the polyacid curing agent is used, it is typically present in the coating composition in amounts of about 5 to 75, preferably 5 to 50 percent by weight based on total weight of resin solids.

The equivalent ratio of the reactants present in the composition are preferably adjusted that for each equivalent of epoxy there are 0.5 to 1.5, preferably 0.8 to 1.2 equivalents of carboxyl (a nhydride being considered monofunctional).

The compositions will also preferably contain catalysts to accelerate the cure of the epoxy and carboxyl groups. Examples of suitable catalysts are basic materials and include organic amines and quaternary ammonium compounds such as pyridine, piperidine, dimethylaniline, diethylenetriamine, tetramethylammonium chloride, tetramethylammonium acetate, tetramethylbenzylammonium acetate, tetrabutylammonium fluoride, and tetrabutylammonium bromide. The amount of catalyst is typically from 0.1 to 10, preferably 0.5 to 3 percent by weight based on weight of resin solids.

Also, optional ingredients such as plasticizers, antioxidants, and UV light absorbers can be included in the composition. These ingredients typically are present in amounts of up to 25 percent by weight based on total resin weight. For colored and/or textured coatings, pigments may be included in the compositions. Pigment contents in amounts of up to 75 percent by weight based on total solids can be used.

The compositions of the present invention are liquid compositions and are formulated into liquid high solids coating compositions, that is, those coating compositions containing greater than 40, preferably greater than 55 percent by weight resin solids. The solids content is determined by formulating the coating composition to a No. 4 Ford cup viscosity of 25-30 seconds at 76° F. (24° C.) and heating the composition to 105°-110° C. for 1 to 2 hours to drive off the volatile material.

The curable compositions of the invention can be applied as coatings to a substrate by any of the conventional coating techniques such as brushing, spraying, dipping or flowing, but it is preferred that spray applications be used since this gives the best appearance. Any of the known spray techniques may be employed such as compressed air spraying, airless spraying, electrostatic spraying and either manual or automatic methods.

After application of the coating composition to the substrate, the coated substrate is heated to cure the coating. In the curing operation, solvents are driven off and the film-forming material of the coating composition is crosslinked through reaction of the carboxyl groups and epoxy groups. The heating or curing operation is usually carried out at a temperature in the range of from 160°-350° F. (71°-177° C.). The thickness of the coating is usually from about 0.1 to 5, preferably 0.1 to 3 mils.

Preferably, the compositions of the present invention, particularly those prepared with the aliphatic polyepoxides and with the epoxy-containing acrylic polymers, are used to formulate clear coats for use in a color-plus-clear application. In a color-plus-clear application, a composite coating is applied to a substrate. The process comprises applying to the substrate a pigmented or colored film-forming composition to form a base coat and applying to the base coat a second film-forming composition to form a transparent top coat over the base coat.

The film-forming composition of the base coat can be any of the compositions useful in coating applications, particularly automotive applications in which the color-plus-clear coating applications are finding their most use. A film-forming composition conventionally comprises a resinous binder and a pigment to act as a colorant. Particularly useful resinous binders are acrylic polymers, polyesters including alkyds, and polyurethanes.

The resinous binder for the base coat can be an organic solvent-based material such as those described in U.S. Pat. No. 4,220,679, note column 2, line 24, continuing through column 4, line 40. Also, water-based coating compositions such as those described in U.S. Pat. No. 4,403,003 and U.S. Pat. No. 4,147,679 can also be used as the binder in the base coat composition. The resinous binder for the base coat can also be the curable composition of the present invention.

The base coat composition also contains pigments including metallic pigmentation to give it color. Examples of suitable pigmentations for the base coat are described in the aforementioned U.S. Pat. Nos. 4,220,679; 4,403,003 and 4,147,679.

Optional ingredients in the base coat composition are those which are well known in the art of formulating surface coatings and include surfactants, flow control agents, thixotropic agents, fillers, anti-gassing agents, organic co-solvents, catalysts and other customary auxiliaries. Examples of these materials and suitable amounts are described in the aforementioned U.S. Pat. Nos. 4,220,679; 4,403,003 and 4,147,679.

The base coat compositions can be applied to the substrate by any of the conventional coating techniques such as bruising, spraying, dipping or flowing, but they are most often applied by spraying. The usual spray techniques and equipment for air spraying, airless spraying and electrostatic spraying in either manual or automatic methods can be used.

During application of the base coat to the substrate, a film of the base coat is formed on the substrate typically in a thickness of about 0.1 to 5 and preferably about 0.1 to 2 mils.

After forming a film of the base coat on the substrate, solvent, that is, organic solvent and/or water, is driven out of the base coat film by heating or simply an air drying period before application of the clear coat. Preferably, the heating step will only be that sufficient and for a short period of time to insure that the clear top coat composition can be applied to the base coat without the former dissolving the base coating composition, that is, "striking in". Suitable drying conditions will depend on the particular base coat composition, on the ambient humidity with certain water-based compositions, but in general a drying time of from about 1 to 15 minutes at a temperature of about 70°–175° F. (21°–79° C.) will be adequate to insure that mixing of the two coats is minimized. At the same time, the base coat film is adequately wetted by the clear top coat composition so that satisfactory intercoat adhesion can be obtained. Also, more than one base coat and more than one top coat may be applied to develop optimum appearance. Usually between coats, the previously applied base coat or top coat is flashed, that is, exposed to ambient conditions for about 1 to 20 minutes.

The clear top coat composition is applied to the base coat by any of the conventional coating techniques mentioned above, although spray applications are preferred. As mentioned above, the clear top coat is applied to the base coat via a wet-on-wet technique before the base coat has been cured. The two coatings are then heated to conjointly harden both coating layers. Curing conditions such as described above can be used. Clear coats typically have thicknesses of 0.5 to 5, usually 1 to 2.5 mils.

The invention will be further defined by reference to the following examples. Unless otherwise indicated, all parts are by weight.

EXAMPLES

The following Examples A–G show the preparation of a polyepoxide, a polyacid and various alpha-olefin-maleic anhydride copolymers which are useful in the practice of the present invention.

Example A

An epoxy-containing acrylic polymer was prepared from the following mixture of ingredients:

| Ingredients | Weight (in grams) | Solids (in grams) | |
| --- | --- | --- | --- |
| Glycidyl methacrylate | 2080.0 | 40.0 | |
| Methyl methacrylate | 1716.0 | 33.0 | |
| Butyl acrylate | 1300.0 | 25.0 | |
| Styrene | 104.0 | 2.0 | |
| VAZO-67[1] | 260.0 | 5.0 | (on monomers) |
| Tertiary-butyl perbenzoate | 104.0 | 2.0 | (on monomers) |
| Tertiary-butyl perbenzoate (post addition) | 26.0 | 0.5 | (on monomers) |

[1]Alpha, alpha'-dimethylazobis(isobutyronitrile) available from E. I. DuPont de Nemours and Company.

Xylene (2996.7 grams) was charged to a suitable reactor and heated to reflux to remove water through a Dean-Stark trap. The glycidyl methacrylate, methyl methacrylate, butyl acrylate, and styrene were mixed together. The VAZO-67, first portion of tertiary-butyl perbenzoate and 500.0 grams of xylene were also premixed together. The premixture of vinyl monomers and the premixture of initiators were added simultaneously to the reaction vessel over a period of about three hours while maintaining the reaction temperature at reflux. At the completion of the addition, the reaction mixture was held at reflux for one hour followed by the addition of the second portion of tertiary-butyl perbenzoate and 100 grams of xylene. The reaction mixture was held for two hours at reflux followed by cooling to room temperature. The reaction mixture had a solids content of about 58 percent and a number average molecular weight of about 1,300 as determined by gel permeation chromatography using a polystyrene standard.

Example B

A polyacid half-ester of 1-(3-hydroxy-2,2-dimethylpropyl)-3-hydroxy-2,2-dimethylpropionate (ESTER DIOL 204) and methylhexahydrophthalic anhydride was prepared from the following mixture of ingredients:

| Ingredients | Parts by Weight (in grams) |
| --- | --- |
| ESTER DIOL 204 | 2550.0 |
| Methylhexahydrophthalic anhydride[1] | 4116.0 |
| Methyl isobutyl ketone | 1466.5 |
| Ethanol | 666.6 |

[1]MILLDRIDE from Milliken Chemicals believed to be a mixture of methylhexahydrophthalic anhydride and hexahydrophthalic anhydride.

The ESTER DIOL 204 and 1466.5 grams of the methyl isobutyl ketone were charged to a reaction vessel and heated under a nitrogen atmosphere to 115° C. The methylhexahydrophthalic anhydride was added over a 90-minute period. The reaction mixture was held at Z115° C. for four hours. The reaction mixture was then cooled to 100° C. followed by the addition of ethanol (to react with residual anhydride) and heating the reaction mixture to reflux and holding for two hours. The reaction mixture was stripped to a pot temperature of 125° C. The reaction mixture was then adjusted to 80 percent solids with methyl isobutyl ketone.

Example C

A 1-decene-maleic anhydride copolymer was prepared as follows:

To a reaction vessel fitted with a condenser, thermometer, nitrogen sparging inlet and agitator was charged 1123 grams (g.) (8 moles) of 1-decene. As the 1-decene was heated at a reflux temperature of 145° C., a first mixture of 147.5 g. of tert-amyl peroxyacetate (available form Pennwalt Corporation as a 60 percent solids solution in mineral spirits as LUPERSOL 555-M60) and 80 g. of butyl acetate was added over a period of three hours. Beginning a half hour after the start of the first addition, a second mixture of 393.2 g. (4 moles) of maleic anhydride, 401.2 g. of acetone and 246.9 g. of butyl acetate was added over a period of two hours. After completion of the additions, heating was continued at 145°–146° C. for one hour. Thereafter, solvent was removed by distillation with a total distillate of 290 g. being removed. The reaction mixture was cooled to room temperature and thinned with butyl acetate to a solids content of 75.4 percent. The copolymer had a number average molecular weight of about 1,697 and a weight average molecular weight of about 3,620.

Example D

A 1-octene-maleic anhydride copolymer was prepared as follows:

To a reaction vessel equipped as described in Example C was charged 1821.6 g. (16.23 moles) of 1-octene. As the 1-octene was heated at a reflux temperature of 120° C., a first mixture of 458.9 g. of benzoyl peroxide (available as 78 percent by weight aqueous mixture from Pennwalt Corporation as LUCIDOL 78) and 3781.8 g. of butyl acetate was added over a period of three hours. Beginning a half hour after the start of the first addition, a second mixture of 794.8 g (8.1 moles) of maleic anhydride and 1890.9 g. of butyl acetate was added over a period of two hours. After completion of the additions, heating at reflux was continued for one hour. Thereafter, solvent was removed by distillation with a total distillate of 5457 g. removed. The copolymer had a solids content of 75.9 percent, a number average molecular weight of about 1061 and a weight average molecular weight of about 2731.

Example E

A 1-hexane-maleic anhydride copolymer was prepared as follows:

To a reaction vessel equipped as described in Example C was charged 109 g. (1.3 moles) of 1-hexene. As the 1-hexene was heated to reflux, a first mixture of 36.7 g. of LUCIDOL 78 and 302.5 g. of butyl acetate was added over a period of 2½ hours. Beginning a half hour after the start of the first addition, a second mixture of 63.6 g. (0.65 moles) of maleic anhydride and 151.3 g. of butyl acetate was added over a period of 1½ hours. After completion of the additions, heating at reflux was continued for one hour. Thereafter, solvent was removed by distillation with a total distillate of 396.3 g. being removed. The copolymer had a solids content of 66 percent, a number average molecular weight of 1000 and a weight average molecular weight of 4274.

Example F

A 1-octene-maleic anhydride copolymer was prepared as follows:

To a reaction vessel equipped as described in Example C was charged 3024 g. (27 moles) of 1-octene. As the 1-octene was heated to reflux temperature at 120° C., a first mixture of 182 g. of LUPERSOL 555-M60 and 825 g. of butyl acetate was added over a period of three hours. Beginning a half hour after the start of the first addition, a second mixture of 1323 g. (13.5 moles) of maleic anhydride and 3407 g. of butyl acetate was added over a period of two hours. After completion of the additions, heating at reflux was continued for one hour. Thereafter, solvent was removed by distillation with a total distillate of 5453 g. being removed. The remaining product had a solids content of 97 percent, number average molecular weight of 2217 and a weight average molecular weight of 5906.

Example G

The benzyl alcohol half-ester of a 1-octene-maleic anhydride copolymer was prepared as follows:

To a reaction vessel equipped with a condenser, thermometer, nitrogen sparging inlet and agitator was charged 1129.6 g. (3.9 moles) of the maleic anhydride-1-octene copolymer of Example D and 70.4 g. of benzyl alcohol. The ingredients were heated to 105° C. and held for one hour followed by cooling to room temperature.

EXAMPLES 1–7

The following Examples show the formulation of clear coats using the polyepoxides, polyacid and alpha-olefin-maleic anhydride copolymers of Examples A–G.

Example 1

The following Example shows the formulation of a clear coat containing no alpha-olefin-maleic anhydride copolymer. A base mix was formulated from the following ingredients:

| Ingredient | Parts by Weight (in grams) | Solids (in grams) |
|---|---|---|
| TINUVIN 328[1] | 3.0 | 3.0 |
| TINUVIN 292[2] | 1.0 | 1.0 |
| Polybutylacrylate[3] | 0.4 | 0.25 |
| MULTIFLOW[4] | 0.5 | 0.25 |
| ARMEEN DM-12D[5] | 4.0 | 4.0 |
| 25/75 hexyl acetate/ methyl isobutyl ketone | 16.0 | — |
| RESIMINE 717[6] | 16.4 | 13.8 |
| Silica grind[7] | 12.5 | 5.4 |
|  |  | (4.4 resin, 1.0 pigment) |

[1]Substituted benzotriazole UV light stabilizer available from Ciba-Geigy Corp.
[2]Hindered amine UV light stabilizer available from Ciba-Geigy.
[3]Mw of about 10,000 and Mn of about 2400; 58.8 percent solids in xylene.
[4]50 percent solution of poly(2-ethylhexylacrylate) in xylene available from Monsanto Co.
[5]N,N-dimethyldodecylamine catalyst available from AKZO Chemical.
[6]Methylated melamine-formaldehyde condensate available from Monsanto Co.; 84 percent solids in n-butanol.
[7]8 percent fumed silica ground in 35 percent RESIMINE 717 solution and 57 percent ethanol.

The ingredients were mixed in the order indicated with a low shear mixer to form the base mix.

The base mix was mixed with the following ingredients to form the coating composition.

| Ingredients | Parts by Weight (in grams) | Solids (in grams) |
|---|---|---|
| Base Mix | 53.8 | 27.7 |
| ERL 4299[1] | 19.6 | 19.6 |
| Epoxy-containing acrylic polymer of Example A | 30.5 | 18.3 |
| Polyacid of Example B | 54.9 | 43.9 |
| 25/75 hexyl acetate/ methyl isobutyl ketone | 15.7 | — |

[1]Cyclohexane oxide moiety containing polyepoxide from Union Carbide Corp.

The ingredients were mixed with a low shear mixer in the order indicated to form the coating composition which was then applied as a clear coat over both an aluminum metallic base coat and a black base coat which had been previously spray applied to a primed steel panel. The base coat was given a 15-minute flash at room temperature followed by the application of the clear coat. The clear coat was given a 15-minute flash at room temperature followed by curing the composite coating for 30 minutes at 250° F. (121° C.). The properties of the coating composition and the cured coating are reported in the Table below.

Example 2

The following Example shows the formulation of a coating composition with both the polyacid of Example B and the 1-octene-maleic anhydride copolymer of Example D.

| Ingredients | Parts by Weight (in grams) | Solids (in grams) |
|---|---|---|
| Base Mix of Example 1 | 53.8 | 27.7 |
| ERL 4299 | 20.9 | 20.9 |
| Epoxy-containing acrylic polymer of Example A | 32.2 | 19.4 |
| Polyacid of Example B | 25.9 | 20.7 |
| 1-octene-maleic anhydride copolymer of Example D | 27.4 | 20.8 |
| 25/75 hexyl acetate/ methyl isobutyl ketone | 14.2 | — |

The ingredients were mixed in the order indicated and applied as a clear coat as described in Example 1. The properties of the coating composition and the cured composite coatings are reported in the Table below.

Example 3

The following Example shows the formulation of a coating composition with no polyacid and the 1-octene-maleic anhydride copolymer of Example D.

| Ingredients | Parts by Weight (in grams) | Solids (in grams) |
|---|---|---|
| Base Mix of Example 1 | 53.8 | 27.7 |
| ERL 4299 | 23.4 | 23.4 |
| Epoxy-containing acrylic polymer of Example A | 36.2 | 21.7 |
| 1-octene-maleic anhydride copolymer of Example D | 48.4 | 36.7 |
| 25/75 hexyl acetate/ methyl isobutyl ketone | 12.7 | — |

The ingredients were mixed in the order indicated and applied as a clear coat as described in Example 1. The properties of the coating composition and the cured composite coatings are reported in the Table below.

Example 4

The following Example shows the formulation of a coating composition with the benzyl alcohol half-ester of the 1-octene-maleic anhydride copolymer of Example G.

| Ingredients | Parts by Weight (in grams) | Solids (in grams) |
|---|---|---|
| Base Mix of Example 1 | 53.8 | 27.7 |
| ERL 4299 | 19.7 | 19.7 |
| Epoxy-containing acrylic polymer of Example A | 30.7 | 18.4 |
| Polyacid of Example B | 24.5 | 19.6 |
| Copolymer of Example G | 33.2 | 24.1 |
| 25/75 hexyl acetate/ methyl isobutyl ketone | 12.7 | — |

The ingredients were mixed in the order indicated and applied as a clear coat as described in Example 1. The properties of the coating composition and the cured composite coatings are reported in the Table below.

Example 5

The following Example shows the formulation of a coating composition with the 1-decene-maleic anhydride copolymer of Example C.

| Ingredients | Parts by Weight (in grams) | Solids (in grams) |
|---|---|---|
| Base Mix of Example 1 | 53.8 | 27.7 |
| ERL 4299 | 19.4 | 19.4 |
| Epoxy-containing acrylic polymer of Example A | 30.0 | 18.0 |
| Polyacid of Example B | 24.0 | 19.2 |
| 1-decene-maleic anhydride copolymer of Example C | 33.4 | 25.2 |
| 25/75 hexyl acetate/ methyl isobutyl ketone | 13.9 | — |

The ingredients were mixed in the order indicated and applied as a clear coat as described in Example 1. The properties of the coating composition and the cured composite coatings are reported in the Table below.

Example 6

The following Example shows the formulation of a coating composition with the 1-hexene-maleic anhydride copolymer of Example E.

| Ingredients | Parts by Weight (in grams) | Solids (in grams) |
|---|---|---|
| Base Mix of Example 1 | 53.8 | 27.7 |
| ERL 4299 | 21.6 | 21.6 |
| Epoxy-containing acrylic polymer of Example A | 33.7 | 20.2 |
| Polyacid of Example B | 26.8 | 21.4 |
| 1-hexene-maleic anhydride copolymer of Example E | 29.1 | 18.6 |
| 25/75 hexyl acetate/ methyl isobutyl ketone | 9.5 | — |

The ingredients were mixed in the order indicated and applied as a clear coat as described in Example 1. The properties of the coating composition and the cured composite coatings are reported in the Table below.

EXAMPLE 7

The following Example shows the formulation of a coating composition with the 1-octene-maleic anhydride copolymer of Example F.

| Ingredients | Parts by Weight (in grams) | Solids (in grams) |
|---|---|---|
| Base Mix of Example 1 | 53.8 | 27.7 |
| ERL 4299 | 20.9 | 20.9 |

-continued

| Ingredients | Parts by Weight (in grams) | Solids (in grams) |
|---|---|---|
| Epoxy-containing acrylic polymer of Example A | 32.3 | 19.4 |
| Polyacid of Example B | 25.9 | 20.7 |
| 1-octene-maleic anhydride copolymer of Example F[1] | 41.6 | 20.8 |
| 25/75 hexyl acetate/ methyl isobutyl ketone | 9.5 | — |

[1]50 percent solids in methyl isobutyl ketone.

The ingredients were mixed in the order indicated and applied as a clear coat as described in Example 1. The properties of the coating composition and the cured composite coatings are reported in the Table below.

TABLE

Properties of Coating Composition and Color-Clear Composite Coatings of Examples 1-7

| Example No. | Thickness (in mils) Base | Thickness (in mils) Clear | No. 4 Ford Cup Viscosity (in seconds) | Theory Resin Solids | Actual Resin Solids | 20° Gloss[1] | DOI[2] | Adhesion[3] | Hardness[4] Pencil/Tukon | Xylene Resistance[5] | Humidity Resistance[6] Appearance | Humidity Resistance[6] Gloss | Mar Resistance[7] |
|---|---|---|---|---|---|---|---|---|---|---|---|---|---|
| 1 | 0.5 | 1.6 | 23.5 | 62.8 | 60.3 | 88.5 | 80 | 5− | H/10.25 | H | severe blush | 42.8 | poor |
| 2 | 0.5 | 1.6 | 23.5 | 62.0 | 59.4 | 90.8 | 80 | 5 | H/7.67 | H | slight blush | 73.7 | fair |
| 3 | 0.5 | 1.5 | 23 | 61.5 | 57.9 | 91.1 | 70 | 5− | H/5.70 | B | very slight blush | 81.1 | pass |
| 4 | 0.5 | 1.5 | 23.5 | 60.8 | 58.0 | 90.9 | 80 | 5 | H/8.20 | H | very slight blush | 77.8 | fair |
| 5 | 0.5 | 1.7 | 23.5 | 62.4 | 59.8 | 75.2 | 50 | 5 | H/5.15 | 4 B | slight blush | 55.1 | poor |
| 6 | 0.5 | 1.7 | 23 | 59.8 | 57.3 | 91.0 | 75 | 3 | H/11.40 | H | slight blush | 81.5 | good |
| 7 | 0.5 | 1.6 | 23.5 | 59.0 | 58.1 | 90.1 | 75 | 4 | H/10.45 | H | very slight blush | 84.9 | good |

[1]Measured with a 20 degree gloss meter manufactured by Hunter Lab.
[2]Distinctness of Image (DOI) determined on a C-Box manufactured by C-Box I[2]R Co.
[3]Crosshatch adhesion determined generally in accordance with the procedures of ASTM 3359. The adhesion was rated 0-5 with 5 indicating excellent adhesion.
[4]Tukon hardness number determined by ASTM E-48. Pencil hardness determined by taking series of standard pencils of varying hardness with H being the hardest and B being the softest and scratching the panels with pencils of increasing hardness until the coating was etched away.
[5]Two (2) drops of xylene are placed on the panel for 3 minutes. The pencil hardness of the spot in contact with the xylene is then determined. How much the coating softens compared to the original pencil hardness is a measure of the xylene resistance.
[6]Humidity resistance determined by using the coated panel as the ceiling of a humidity chamber (QCT chamber) with the coating directed inwardly towards the chamber. The chamber is heated to 140° F. (60° C.) and about a 2-inch (3 cm) level of water is located 3 to 5 inches below the coated panel (panel sloped). After being exposed for 24 hours, the appearance and 20° gloss of the exposed coating was determined and compared with the original appearance and gloss before testing.
[7]Coating scratched with a fingernail. Ratings are poor for heavy marking of the coating; fair for slight marking of the coating and good for no marking.

Mar resistance determined over black coatings and other properties determined over the silver coating.

We claim:

1. A curable, liquid coating composition containing organic solvent and a resinous binder, said resinous binder comprising:
   (a) a polyepoxide,
   (b) a copolymer of an alpha-olefin or a cycloolefin and an olefinically unsaturated monoanhydride including a partial ester thereof; and
   (c) a carboxy-terminated polyester polyacid curing agent containing at least two carboxyl groups per molecule;
said coating composition having a resin solids content of at least 40 percent by weight.

2. The composition of claim 1 in which the polyepoxide is a copolymer of a monoethylenically unsaturated monomer having at least one epoxy group and at least one monoethylenically unsaturated monomer which is free of epoxy groups.

3. The composition of claim 1 in which the polyepoxide is a cyclohexane oxide moiety containing polyepoxide.

4. The composition of claim 1 in which the carboxyl-terminated polyester is a half-ester of the structure:

$$X\text{+}O-\underset{\underset{O}{\|}}{C}-R-\underset{\underset{O}{\|}}{C}-OH)_A$$

where X is the residue of a polyol after reaction with a 1,2-dicarboxylic acid anhydride, R is an organic moiety associated with the anhydride, and A is equal to at least 2.

5. The composition of claim 1 in which the olefinically unsaturated monoanhydride is maleic anhydride.

6. The composition of claim 1 in which the alpha-olefin contains from 4 to less than 10 atoms.

7. The composition of claim 6 in which the alpha-olefin is selected from the class consisting of 1-hexene and 1-octene.

8. The composition of claim 1 in which the copolymer (b) has a weight average molecular weight of less than 15,000.

9. The composition of claim 1 in which the polyepoxide is present n the crosslinkable composition in amounts of about 20 to 75 percent by weight based on weight of resin solids.

10. The composition of claim 1 in which the polyacid curing agent is present in the composition in amounts of about 5 to 50 percent by weight based on weight of resin solids.

11. The composition of claim 1 in which the copolymer (b) is present in the composition in amounts of about 5 to 40 percent by weight based on weight of resin solids.

12. The composition of claim 1 in which the equivalent ratio of carboxyl to epoxy is from 0.8 to 1.2 to 1 and is sufficient to form a cured product.

13. The composition of claim 1 which has a resin solids content of at least 55 percent by weight.

* * * * *

UNITED STATES PATENT AND TRADEMARK OFFICE
CERTIFICATE OF CORRECTION

PATENT NO. : 4,927,868

DATED : May 22, 1990

INVENTOR(S) : Karl F. Schmimmel, William P. Blackburn

It is certified that error appears in the above-identified patent and that said Letters Patent is hereby corrected as shown below:

Col. 14, line 44 (Claim 6) insert --carbon-- before "atoms".

Col. 14, line 52, (Claim 9) "n" should be --in--.

Signed and Sealed this

Eleventh Day of June, 1991

*Attest:*

HARRY F. MANBECK, JR.

*Attesting Officer*   *Commissioner of Patents and Trademarks*